(12) United States Patent
Nedic

(10) Patent No.: US 7,058,141 B1
(45) Date of Patent: Jun. 6, 2006

(54) MLSE DECODING OF PRS TYPE INTER-BIN INTERFERENCE IN RECEIVER-END WINDOWED DMT SYSTEM

(75) Inventor: Slobodan Nedic, Plainsboro, NJ (US)

(73) Assignee: NEC USA, Inc., Princeton, NJ (US)

( * ) Notice: Subject to any disclaimer, the term of this patent is extended or adjusted under 35 U.S.C. 154(b) by 879 days.

(21) Appl. No.: 09/586,441

(22) Filed: Jun. 2, 2000

(51) Int. Cl.
*H04L 27/28* (2006.01)
*H04B 1/66* (2006.01)

(52) U.S. Cl. ................... 375/341; 375/260; 714/795

(58) Field of Classification Search ............... 375/341, 375/259, 346, 260, 316, 340; 714/794–796
See application file for complete search history.

(56) References Cited

U.S. PATENT DOCUMENTS

| | | | | |
|---|---|---|---|---|
| 5,400,322 | A * | 3/1995 | Hunt et al. ................. | 370/468 |
| 5,477,465 | A * | 12/1995 | Zheng ......................... | 702/76 |
| 6,097,763 | A * | 8/2000 | Djokovic et al. ........... | 375/260 |
| 6,302,576 | B1 * | 10/2001 | Ono et al. .................. | 714/794 |
| 6,459,678 | B1 * | 10/2002 | Herzberg .................... | 370/203 |
| 6,563,841 | B1 * | 5/2003 | Nedic et al. ................ | 370/480 |
| 6,628,735 | B1 * | 9/2003 | Belotserkovsky et al. .. | 375/355 |
| 6,631,175 | B1 * | 10/2003 | Harikumar et al. ......... | 375/350 |
| 6,754,261 | B1 * | 6/2004 | Liu et al. .................... | 375/232 |

OTHER PUBLICATIONS

Correlative Level Coding and Maximum Likelihood Decoding; Hisashi Kobayashi; Aug. 6, 1970.
Partial-Response Signaling; Peter Kabal and Subbarayan Pasupathy; Sep. 1975.
Performance of OFDM Systems with Time-Limited Waveforms over Multipath Radio Channels; Slimane Ben Slimane; Nov. 1998.
Time-Limited Orthogonal Multicarrier Modulation Schemes; Renyuan Li and Gunnar Stette; Apr. 19, 1995.
MCM Systems with Waveform Shaping in Multi-User Environments: Effects of Fading, Interference and Timing Errors; Davide Dardari; 1997.
An Orthogonally Multiplexed QAM System Using the Discrete Fourier Transform; Botaro Hirosaki; Jul. 1981.
An Unified Approach to Equalization and Echo Cancellation in QQAM-based Multi-Carrier Data Transmission; Slobodan Nedic; 1997.
An Analysis of Automatic Equalizers for Orthogonally Multiplexed QAM Systems; Botaro Hirsaki; Jan. 1980.

\* cited by examiner

*Primary Examiner*—Kevin Burd
(74) *Attorney, Agent, or Firm*—Ostrolenk, Faber, Gerb & Soffen, LLP

(57) ABSTRACT

An improved method of decoding the Partial-Response Signaling type inter-bin distortion in receiver-end windowed DMT system is disclosed. The method exploits the Maximum Likelihood Sequence Estimation, which yields certain improvements over the conventional DFE-type decoding of PRS signals. Simulation results are shown for the case wherein AWGN is substantially the only impairment. Since in this case the noise samples at the neighboring frequency bin outputs bear correlation of the same type as the correlation introduced among data symbol samples, a trellis imbedded noise prediction/cancellation approach has been devised. It has been shown that performance degradation can be reduced from almost 8 dB to just 1 dB, compared to performance figures with no windowing. Possible applications of this method are for xDSL and wireless OFDM systems.

14 Claims, 13 Drawing Sheets

Illustration of MLSE decoding and noise cancellation in windowed DMT receiver with per-bin equalizer TEQ eliminated, largely simplified or replaced by a simple compromising corrector, C(f), of telephone line amplitude characteristic.

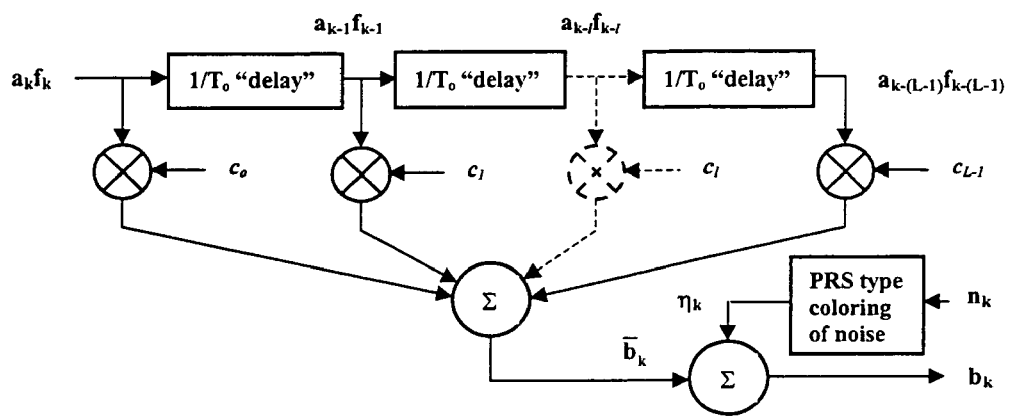
Fig. 1a. Model of generation of inter-bin interference in windowed DMT receiver

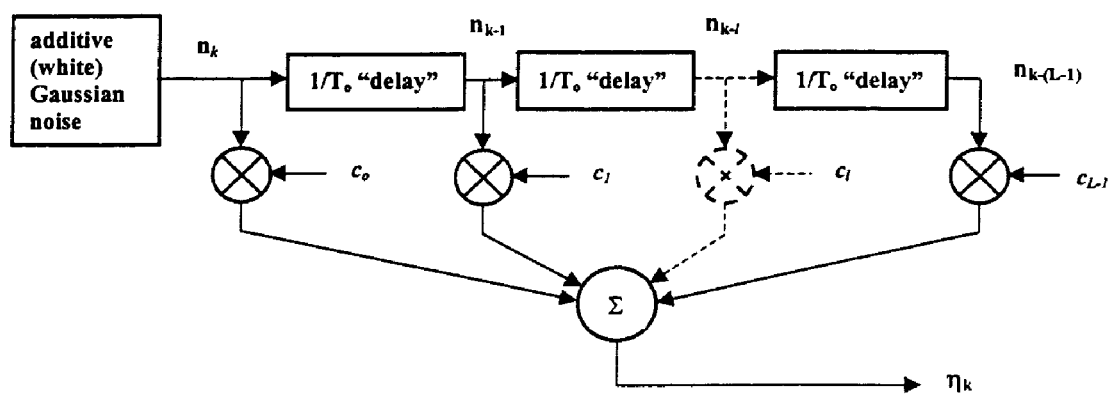
Fig. 1b. Model of noise coloration in windowed DMT receiver

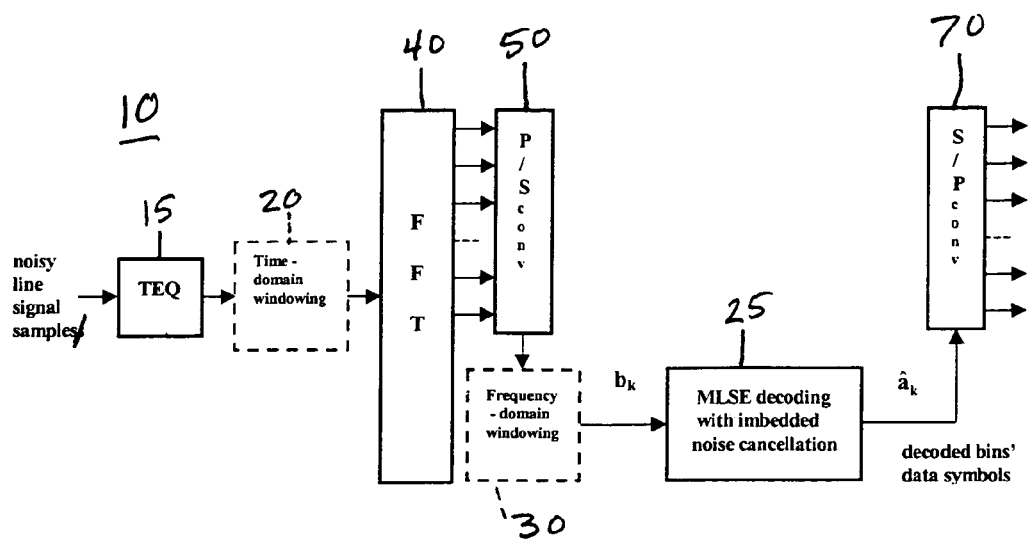
Fig. 2. Illustration of MLSE PRS decoding with noise cancellation in windowed DMT receiver with TEQ.

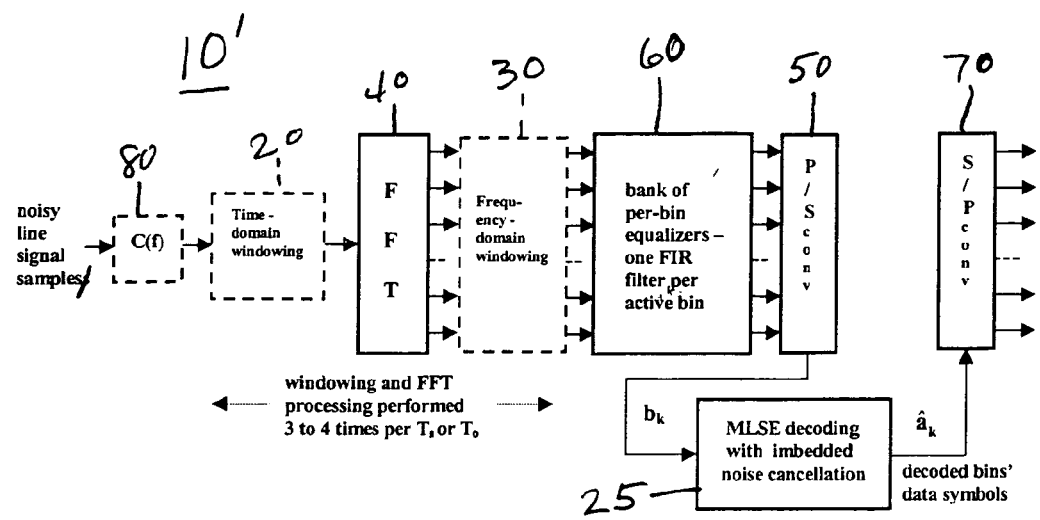
Fig. 3. Illustration of MLSE decoding and noise cancellation in windowed DMT receiver with per-bin equalizer TEQ eliminated, largely simplified or replaced by a simple compromising corrector, C(f), of telephone line amplitude characteristic.

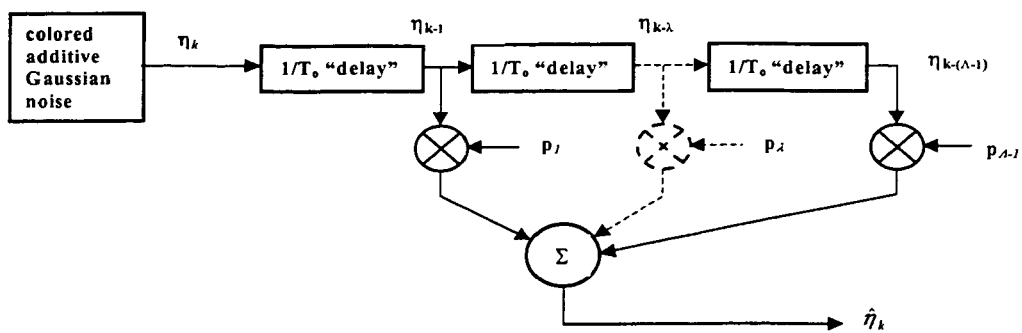
Fig.4. Principal block diagram of noise prediction procedure

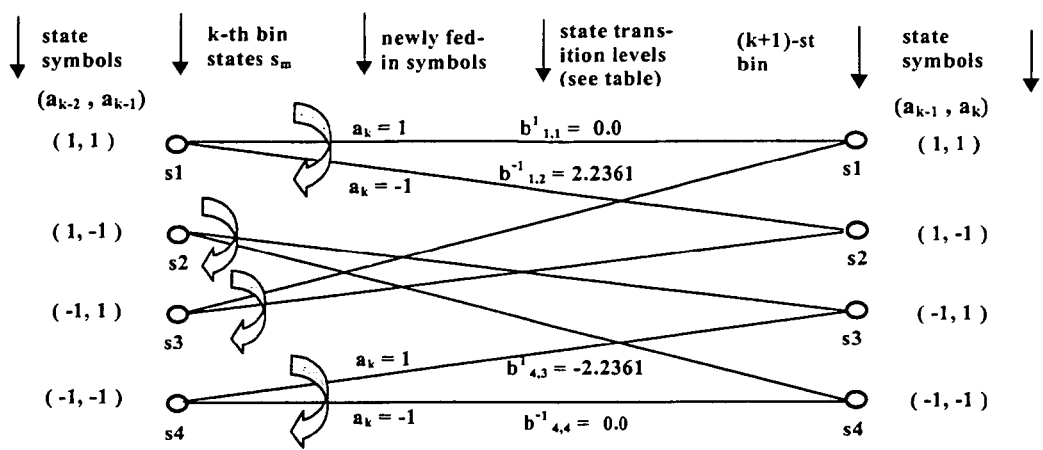
Fig. 5. 4-state trellis diagram corresponding to in-phase or quadrature part of 2-bit constellations; data symbols at $c_1$ tap location of Fig.1 are presented as samples to the right within brackets.

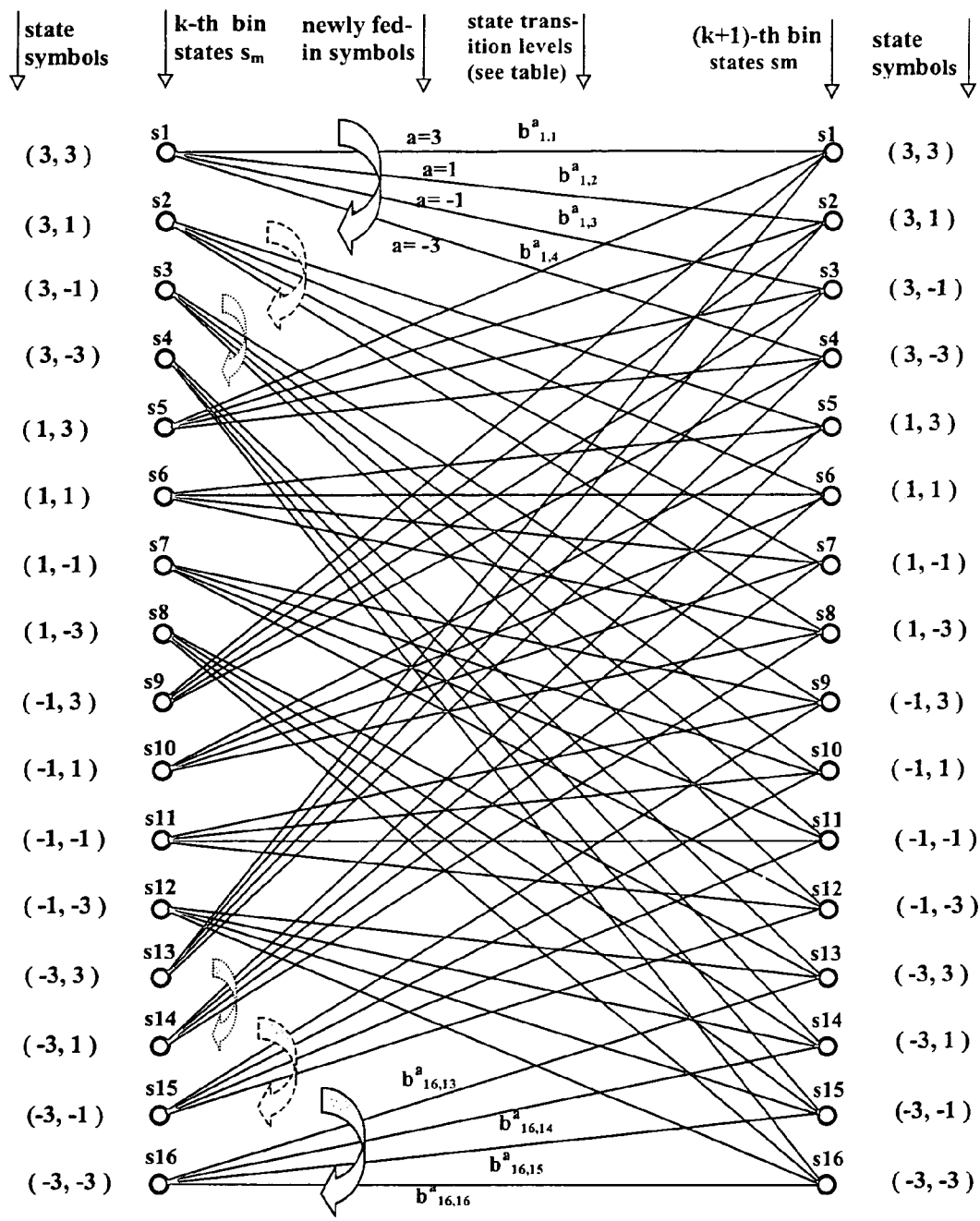
Fig. 6. 16-level trellis diagram for in-phase or quadrature components of 4-bit constellations; symbolsa at $c_1$ tap location of Fig.1 are presented as samples to the right within brackets.

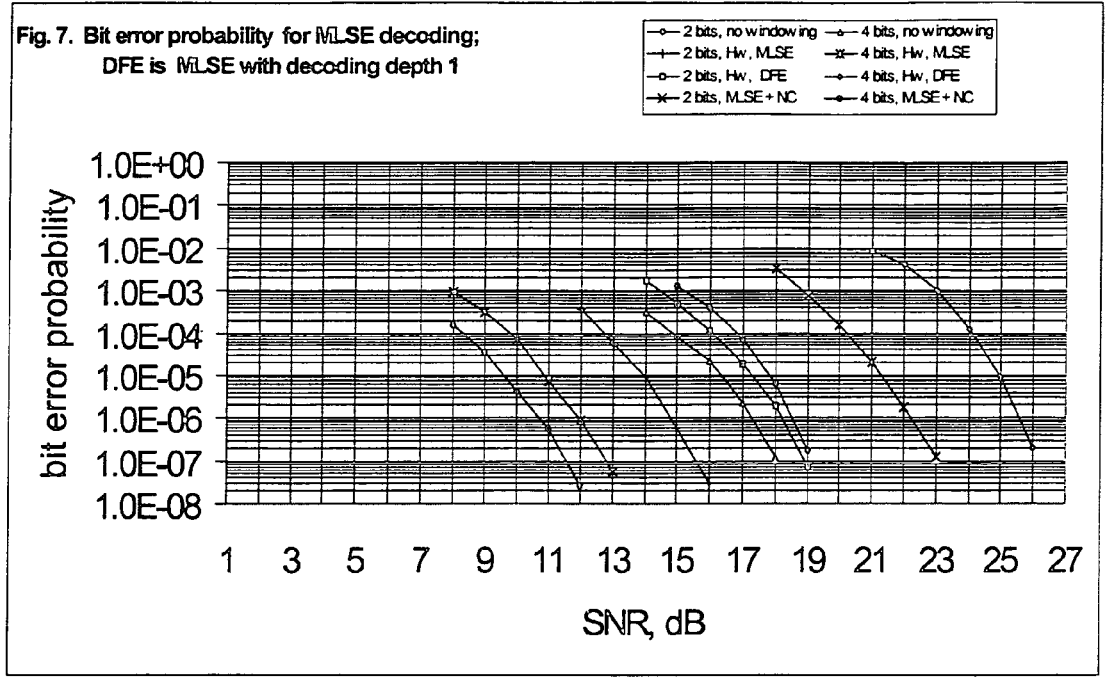

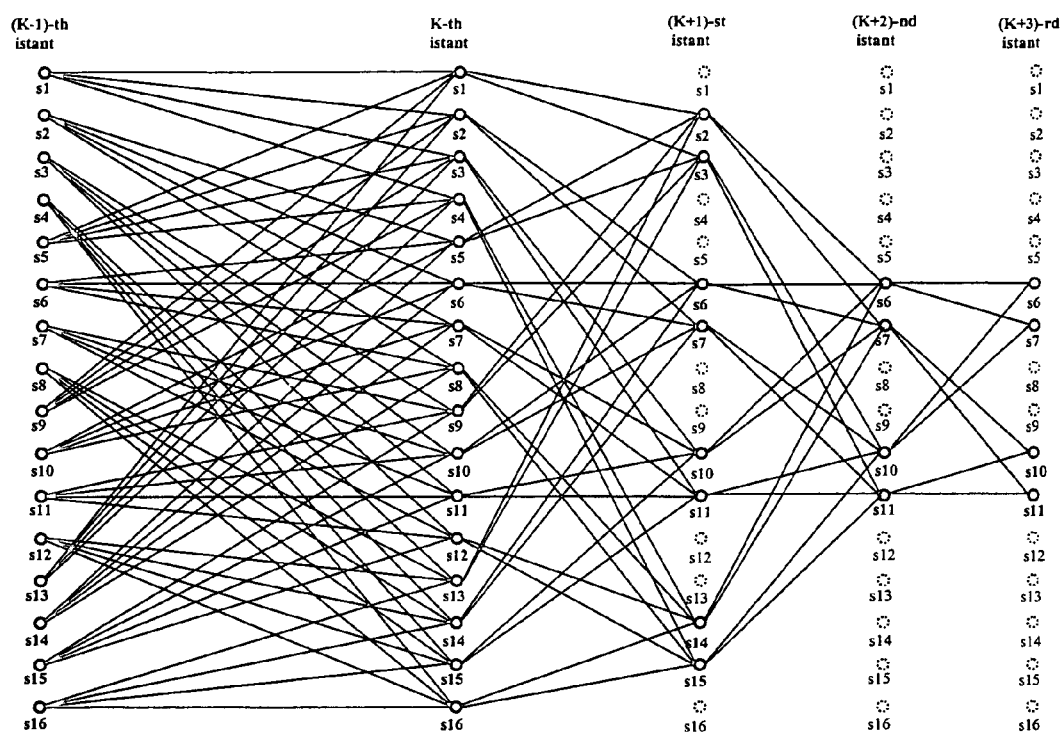
Fig. 8. An example of trellis diagram for abrupt change of number of bits between K-th and (K+1)-st bin from 4 to 2.

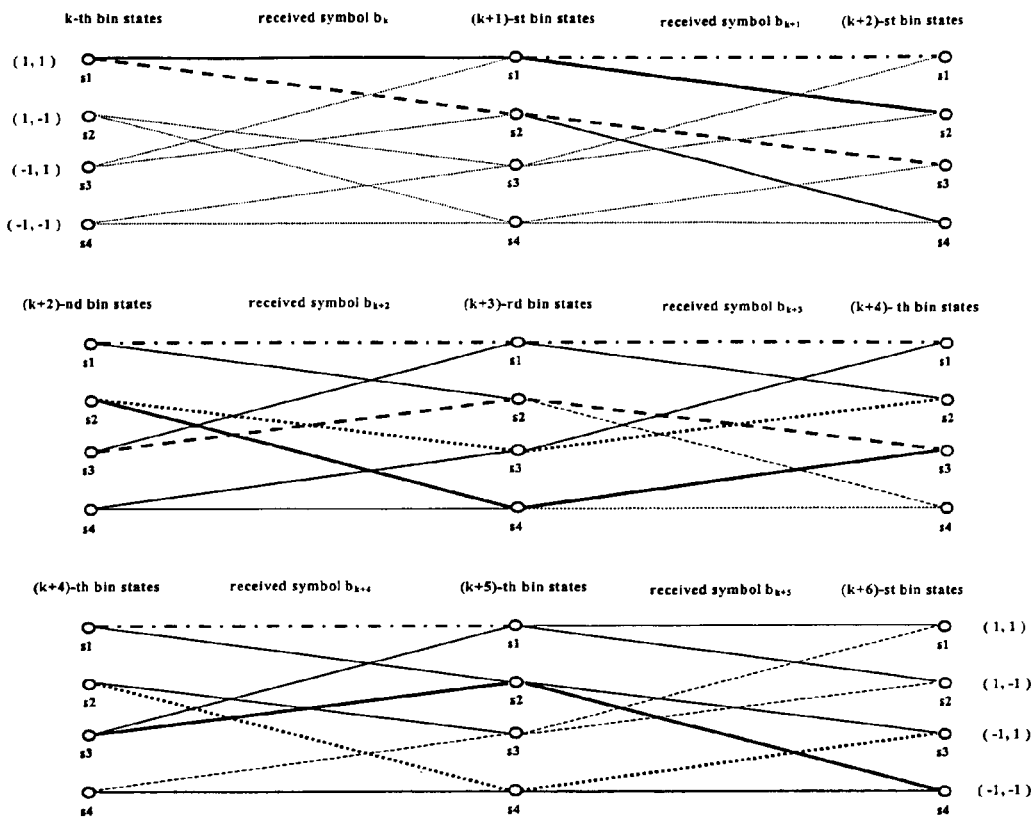
Fig. 9. An example of backward trellis procedure; the last two symbols prior to sending k-th bin symbol are taken to be 1 and 1; the symbols transmitted on bins from k to k+5 are taken to be 1, -1, -1, 1, -1 and -1 so that correct path is shown by bold line; decoding depth is 6.

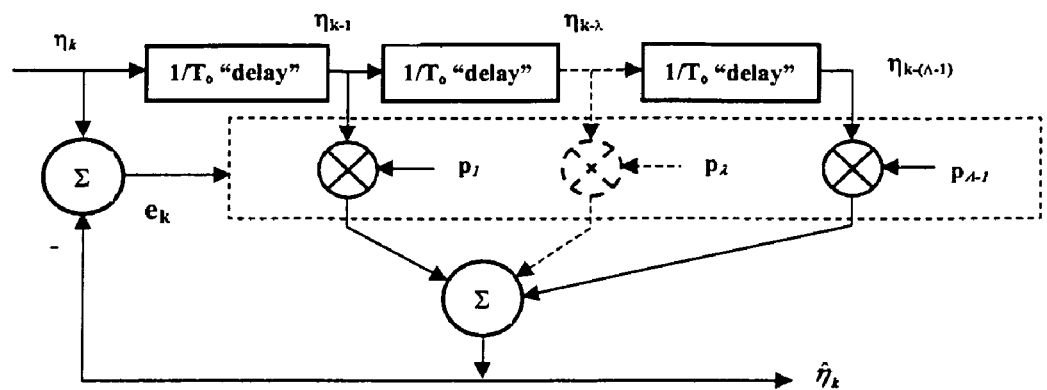
Fig.9a. Illustration of LMS estimation of predictor coefficients

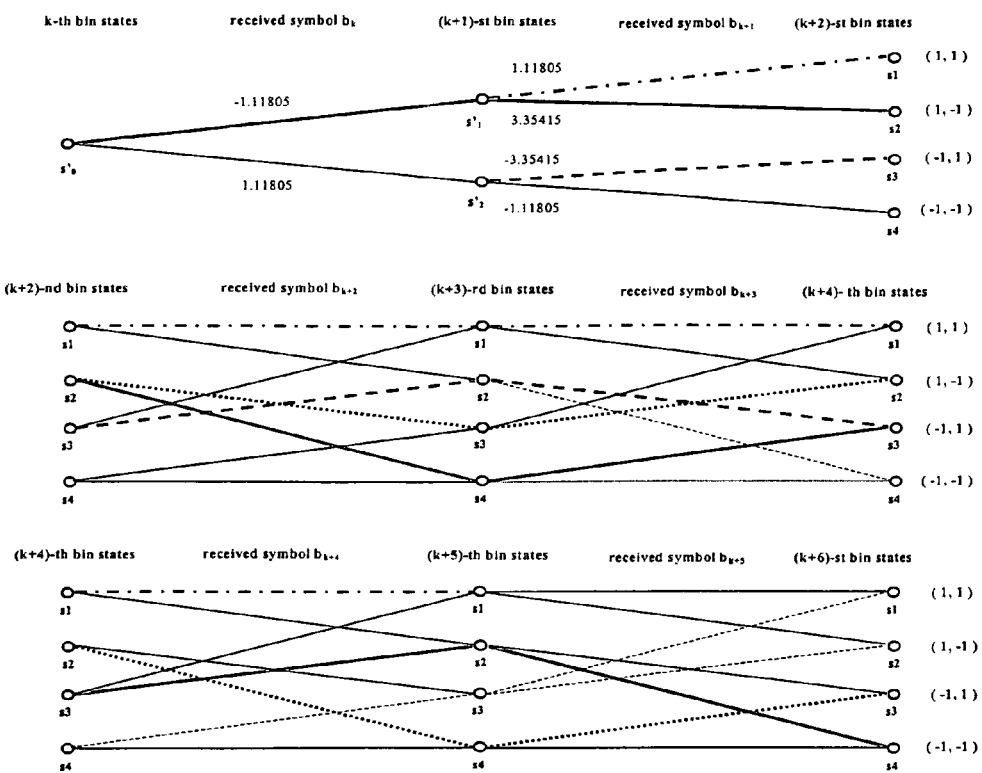
Fig. 10. An example of backward trellis procedure; the last two symbols prior to sending k-th bin symbol are taken to be 0 and 0; the symbols transmitted on bins from k to k+5 are taken to be 1, -1, -1, 1, -1 and -1 so that correct path is shown by bold line; decoding depth is 6. State transition values for first two trellis stages are different from those in table 1 and are shown here.

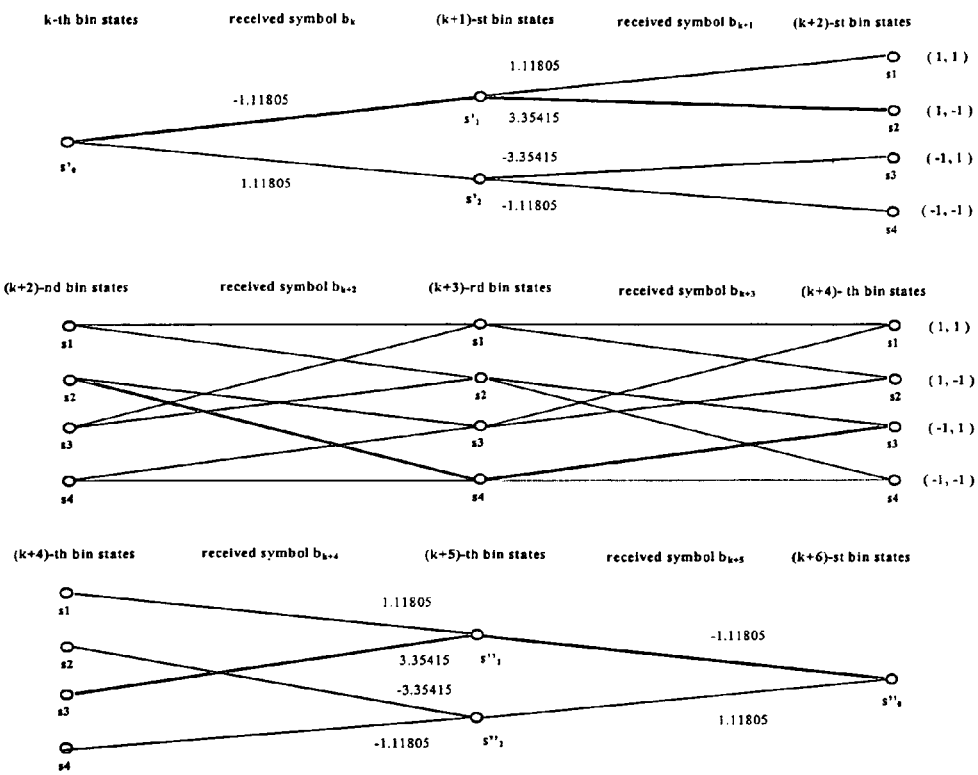
Fig. 11. An example of exhaustive MLSE procedure in case of four active bins separated from other symbols by two zero valued bins; the symbols transmitted on bins from k to k+3 are taken to be 1, -1, -1 and 1 so that correct path is shown by bold line; State transition values for auxilliary first two and the last two trellis stages are different from those in table 1 and are shown here.

MLSE DECODING OF PRS TYPE INTER-BIN INTERFERENCE IN RECEIVER-END WINDOWED DMT SYSTEM

CROSS-REFERENCE TO RELATED APPLICATIONS

This application is related to Ser. No. 09/249,530 filed Feb. 12, 1999 titled "DMT Time-Domain Equalizer [TEQ] Algorithm"; Ser. No. 09/288,478 filed Apr. 8, 1999 titled "Receiver for Discrete Multitone Modulated Signals having Window Function"; and Ser. No. 09/452,570 filed Dec. 1, 1999 titled "Per-bin Adaptive Equalization in Windowed DMT-Type Modem Receiver", the disclosures of which are expressly incorporated by reference.

BACKGROUND OF THE INVENTION

The fast, efficient and error-free transmission of digital information from one point to another has become increasingly important. Many communications systems exist which permit digital information to be transmitted over various types of communication channels, such as wireless channels, fiber-optic channels, and wire line channels.

The present invention will be described in the context of a wire line communications channel, such as a telephone line, which utilizes a twisted pair of copper wires. It is noted that the use of the present invention is not limited to wire line systems, as those skilled in the art will appreciate from the discussion hereinbelow.

A modem is typically used to transmit and receive digital data over a telephone line. Modems employ a modulator to transmit the digital data over the telephone line and a demodulator to receive digital data from the telephone line. One common modulation technique is known as digital multi-tone (DMT) modulation, which requires a discrete multi-tone transmitter and a discrete multi-tone receiver at each modem in a communication system. Often, those skilled in the art refer to such modems as employing a DMT physical layer modulation technique. The systems disclosed in the '478 and '570 applications (as well as the present disclosure) rely on receiver-end windowing to mitigate the problem of spectral leakage in the standardized DMT signaling format. In those systems, windowing is applied only at the receiver side, in order to retain compliance with the present industry standard. The windowing function generally improves performance in the presence of spectrally localized RFI, colored noise and/or insufficient TEQ equalization.

However, this improvement is generally at the expense of reduced performance for DMT bins (sub-channels) in the frequency range where additive white Gaussian noise (AWGN) is the dominant impairment. Therefore, in the '478 application, a combination of windowed and non-windowed bin processing was utilized, selectively retaining frequency-domain windowing only on bins where it is determined that the SNR performance is improved. The side effect of windowing is introduction of inter-bin interference, so that some form of decoding of the partial response signaling (PRS) type is needed. In the '478 application, TEQ channel equalization and DFE (decision feedback equalizer) type decoding is utilized, which is a good compromise between performance and complexity of practical realization.

Decoding based on maximum likelihood sequence estimation (MLSE) has the potential to give better performance than DFE decoding, but at the expense of higher implementation complexity, particularly when it is used in a system like that described in the '478 application. However, with an equalization technique as disclosed in the '570 application, substantially reduced MLSE complexity is achieved, primarily by using the well-known Viterbi algorithm.

Various systems and methods of additional background interest are described in the following references, which will be referred to further below, referenced by figures in brackets, and which are expressly incorporated by reference herein.

[1] R. Li and G. Stette, "Time-Limited Orthogonal multi-carrier modulation schemes:" IEEE Tr. On Communications, February/March/April 1995

[2] D. Dardari, "MCM system with waveform shaping in multi-user environments: Effects of fading, interference and timing errors", Globecom, 1997

[3] H. Kobayashi, "Correlative Level Coding and Maximum-Likelihood Decoding", IEEE Transactions on Information Theory, September 1971

[4] P. P. Kabal and S. Pasupathy, "Partial-Response Signaling", IEEE Tr. On Comm., September 1975

[5] S. B. Slimane, "Performance of OFDM systems with time-limited waveforms over multipath radio channels", Globecom, 8–12 November 1998.

Of particular interest is reference [5], where MLSE was applied on the receiver side in the transmitter-end windowed multicarrier (MC) system of [2], but without skipping every second subchannel. However, transmitter-side windowing is non-compliant with current standards. Further, although transmitter-side MLSE is used in the specific arrangement disclosed in [5], that arrangement fails to provide any suggestion as to how MLSE, windowing or noise cancellation could be used on the receiver side.

SUMMARY OF THE INVENTION

The present invention advantageously employs MLSE decoding and noise cancellation, wherein no transmitter end modifications are required and wherein the effect of windowing-induced noise correlation on MLSE decoding performance is substantially reduced.

If applied to all bins, receiver-end windowing allows for utilization of per-bin equalization, as disclosed in the '570 application, as an alternative to TEQ equalization as disclosed in the '530 application. With per-bin equalization, PRS decoding is needed for all the active bins. Therefore, in order to try to minimize pertinent SNR degradation, the inventor has applied the MLSE (Maximum Likelihood Sequence Estimation) decoding method, which is believed to offer the possibility of better performance. Further, if a relatively high or at least a moderate number of active bins are used, the application of the computationally efficient Viterbi algorithm becomes feasible. The present invention improves the performance of the Hanning window-induced PRS interference decoding by about 3 dB, as compared to the DFE method. This is achieved by applying the conventional (time-domain) decoding procedure along the frequency axis, bin-by-bin, independently for every DMT symbol. In case of essentially grouped active bins separated by a number of non-active bins, the exhaustive search procedure can also potentially be applied with acceptable implementation complexity.

A further aspect of this invention is related to a noise cancellation technique that is embedded within a trellis search procedure of the Viterbi algorithm. With a slightly increased complexity of practical realization, this brings the signal-to-noise ratio (SNR) performance for windowed bins to within just 1 dB of the performance of a non-windowed receiver in case of additive white Gaussian noise (AWGN), while still retaining high improvement on bins impacted by RFI, colored noise and/or insufficient equalization, provided an appropriate selection of generally bin-wise varying noise prediction coefficients.

These methods are applicable to the spectrally well behaved Hanning window as well as to other types of window.

In order to further improve overall system performance, under conditions of generally unpredictable, and changing, impairment of transmission, for example in xDSL and wireless OFDM applications, complete per-bin windowing which simultaneously affects all of the frequency bins in the received DMT signal may be utilized. This technique of MLSE decoding, as opposed to that of DFE type decoding, advantageously compensates for most of the PRS degradation in those applications, no matter whether or what equalization technique is used.

In the present disclosure, the invention is described in the context of an ideal channel, wherein AWGN is the only impairment. It makes use of a Hanning window shape, which allows for independent decoding of in-phase and quadrature components of bin QAM (quadrature amplitude modulation) symbols. This feature is retained also in case of per-bin equalization, where the applicability of this method is primarily targeted.

In a system with a combination of windowing and TEQ type equalization, the FEQ coefficients are taken into consideration in accordance with the model of FIG. 1a, which generally brings a significant increase in realization complexity. In spite of that, this invention is also applicable to this form of DMT receiver, since the use of just two-tap windows and/or exhaustive search on a cluster of bins can still be practically applicable, especially when the number of bits to be loaded per each particular bin is relatively small. Both the application of brute force (exhaustive search) and the application of the Viterbi-algorithm-based MLSE decoding are aspects of the present invention.

These and other aspects of the invention will be understood from the following detailed description of embodiments thereof, with reference to the drawings.

BRIEF DESCRIPTION OF THE DRAWINGS

FIG. 1a illustrates a model of generation of inter-bin interference in a windowed DMT receiver.

FIG. 1b illustrates a model of noise coloration in a windowed DMT receiver.

FIG. 2 is an illustration of PRS MLSE decoding combined with noise canceling in a windowed DMT receiver with TEQ.

FIG. 3 shows an MLSE decoding embodiment with per-bin equalization and noise canceling wherein TEQ is either eliminated, or largely simplified, or replaced by a simple compromising corrector [C(f)], such as a telephone line amplitude characteristic corrector.

FIG. 4 shows an embodiment of an FIR filter predictor for use in a trellis search imbedded noise canceling procedure in the embodiments of FIGS. 2 and 3.

FIG. 5 is a 4-state trellis diagram corresponding to in-phase or quadrature components of 2-bit constellations.

FIG. 6 is a 16-level trellis diagram corresponding to in-phase or quadrature components of 4-bit constellations.

FIG. 7 is an illustration of error probability for MLSE decoding as function of SNR.

FIG. 8 shows an example of a trellis diagram having an abrupt change of the number of bits from 4 to 2 between the K-th and the (K+1)-st bin.

FIG. 9 shows an example of the Viterbi algorithm backward trellis search procedure.

FIG. 9a shows an embodiment of LMS estimation of noise prediction coefficients.

FIG. 10 is an example of trellis diagram and decoding procedure in the case of utilization of no pilot bins.

FIG. 11 shows an example of the brute-force MLSE decoding with exhaustive search of clustered trellises.

DETAILED DESCRIPTION OF EMBODIMENTS OF THE INVENTION

1. INTRODUCTION

Taking as an example the Hanning, or Hahn, or "raised cosine" time domain window, defined as $w(n)=0.5 \cdot (1-\cos(2\pi n/N))$, wherein $n=0, 1 \ldots (N-1)$, applied to a DMT signal within the orthogonality interval comprising N samples, gives rise to inter-bin interference of the Partial Response Signaling class V type with the "impulse response" given by the Partial Response Signaling samples set of $-0.5$, 1 and $-0.5$. The parameter N takes values 512 and 256 in full rate and Lite ADSL systems, respectively. As shown in '478, different window shapes give different PRS impulse responses in the frequency domain and imply a certain degree of degradation in performance, as compared to the non-windowed case. In the Hanning window (Hw) case, the DMT system is somewhat related to a class of orthogonal multi-carrier signals with the time domain shaping, known as TLO [1], where the use of the T/2 offsetting of bin-wise alternating cosine and sine parts assures perfect orthogonality, while providing a considerable increase in each sub-channel's spectral containment. In the foregoing, T is the TLO signaling interval, which is tantamount to the DMT orthogonality interval $T_O$ with symbol interval $T_S$ extended for time-guard interval (known as cyclic prefix) $T_G$, such that $T_S = T_O + T_G$. The application of this type of time-domain windowing to a DMT receiver appears as a TLO variant with non-equal spectral shaping at the transmitter and the receiver, and without TLO staggering. It has spectral shaping opposite to the system proposed recently for wireless application [2], which features transmitter-end windowing and the use of every second bin in order to completely avoid the appearance of inter-bin interference, and to the spectral shaping positioning assumed in [5].

The Maximum Likelihood Sequence Estimation (MLSE) technique in the case of PRS-based single-carrier transmission schemes was introduced long ago [3] as a means to improve decoding performance, as compared to the conventional decision-feedback equalizer (DFE) method [4]. When applied to a receiver-end windowed DMT data transmission system of this invention, the MLSE decoding is performed along the frequency axis, independently for every DMT symbol.

In addition to the PRS interference between neighboring sub-channel bins, the application of the Hanning and other window types increases the amount of the white Gaussian noise at its input, as compared to the inherent rectangular DMT windowing, by a factor of 1.5, or some 1.78 dB. More importantly, since the signal power is also increased by the same amount, the application of the receiver-end windowing results also in noise coloring of the same PRS type encountered in the inter-bin interference. Since the MLSE decoding technique is optimal only in presence of white Gaussian noise additive impairment, this partly limits the achievable performance improvement in the case of receiver-end windowing. However, as it will be shown, by imbedding the noise prediction mechanism into the trellis search procedure, a considerable advantage can be gained by the ability to cancel a considerable part of the correlated noise.

2. INTER-BIN INTERFERENCE MODEL

In the case of a substantially time-domain ('530) or per-bin ('570) equalized DMT system ($f_k=1$), the inter-bin interference induced by time-domain windowing can be modeled by an FIR filter with coefficients c, fed by the sum of modified QAM samples $a_k \cdot f_k$ and additive generally non-white Gaussian noise samples $n_k$, produced at the output of non-windowed data receiver, as shown in FIG. 1a, where the resulting colored additive Gaussian noise samples $\eta_k$ are modeled as separately generated (see FIG. 1b) and summed up with the windowed samples: $b_k = \bar{b}_k + \eta_k$. The model of the colored noise samples generation shown in FIG. 1b is the same FIR filter with $c_l$ coefficients of FIG. 1a, but fed by noise samples $n_k$ appearing at the k-th output of FFT processing block or k-th per-bin equalizer. In the case of TEQ equalization, the transmit bin QAM samples are modified by $f_k$ coefficients, representing the reciprocal values of respective FEQ (one-tap complex frequency-domain equalizer), coefficients, while in case of per-bin equalization the FEQ coefficients are assumed equal to (1,0), so that the same QAM symbols $a_k$ are fed directly to the FIR filter model of FIG. 1a. The noise samples $n_k$ fed to the model of FIG. 1b are the FFT output samples or per-bin equalizer output noise samples as a result of the line, i.e. receiver input noise samples modified by respective FFT and per-bin equalizer processing. In this disclosure, for the sake of illustration, additive white Gaussian channel noise (AWGN) is assumed. The coefficients $c_l$ are defined by the values of the Fourier transform of the window function w(t) at frequencies which are multiples of reciprocal values of the DMT orthogonality interval $T_O$ (250 µs in the full-rate and Lite ADSL standards), starting with the first significantly non-zero value. Further, $a_k$ is the M-ary QAM symbol sent over the k-th sub-channel as the result of mapping a group of $\log_2 M$ bits. Generally, for different bins the number M is different and is given by $2^{b_k}$, where $b_k$ is the number of bits assigned to the k-th bin. By denoting frequency-domain "delays" by D, the equivalent system transfer function, for both signal and noise samples, can be represented by the PRS polynom $$\sum_{l=0}^{L-1} c_l D^{-l},$$

[4]. Note that all symbols above are generally complex valued, but in the sequel these models will be applied to real valued symbols as well.

3. THE MLSE RECEIVER

The modified windowed DMT receiver 10 with time domain equalization 15 and PRS decoding of the MLSE type 25 is presented in FIG. 2. The windowing is performed in time- or in frequency-domain at 20 or 30, respectively.

In the case of per-bin equalization, in the receiver 10' shown in FIG. 3, the equalizers 60 are placed between the appropriately over-sampled FFT block 40 and the P/S converter block 50, as shown in FIG. 3. If done in frequency domain, the windowing 30 precedes the equalizer FIR filters 60. Also shown is a compromising corrector 80, which may be employed at the input.

In both embodiments, an S/P converter block 70 receives the output of the MLSE decoder 25.

a. MLSE Decoding

The maximum likelihood sequence estimation for decoding PRS signals [3] exploits the inherent convolution type code nature of PRS modeling shown in FIG. 1. With reference to the case when the in-phase or quadrature components of M-ary QAM symbols can be decoded separately (Hanning window and per-bin equalization) the combination of $\sqrt{M}$-ary symbols $a_{k-1}$ to $a_{k-L}$ appearing at the delay line taps with coefficients $c_1$ to $c_{L-1}$ define one of ($\sqrt{M}$)$^{L-1}$ possible states of the finite state machine described by the PRS model. This model is also applicable with an ideal channel. With TEQ equalization and other window shapes, complex states have to be used, generally increasing the implementation complexity, such as using an $M^{L-1}$ number of states per-bin in case of TEQ and/or complex PRS coefficients, versus a $2 \cdot (\sqrt{M})^{L-1}$-state trellis in case of per-bin equalization and Hanning window.

Considering, as an example, independently decoded in-phase and quadrature components (FEQ coefficients assumed to be 1, and PRS coefficients are real valued), the input symbol $a_k$ (shown in FIG. 1a) along with the previous L−1 symbols define the output (state transition) level for current state. The next state is defined by the current and previous L−2 symbols, since the content of the delay line (shown in FIG. 1a) is shifted before a new input symbol is introduced. The process of generating PRS samples can be described by a trellis diagram, where the new input symbol defines transition to a new state as well as the value of the signal generated. Examples of the trellises for the case of 2- and 4-bit constellations (M=4 and 16) are shown in FIGS. 5 and 6, respectively, which, along with Tables 1 and 2, systematically describe the process of trellis generation. A particular sequence of transmitted symbols defines just one of the possible paths present in the concatenation of trellis segments of the type shown in FIGS. 5 and 6. Note once more that in-phase or quadrature components are considered separately, giving 1- and 2-bit constellation trellises as particular examples of trellis diagrams of various sizes. Bit to symbol mapping with simple Grey coding (which is different from the standardized ADSL coding) is assumed in these examples. The state transition levels correspond to a QAM constellation of average power equal to 10.

TABLE 1

Full description of the trellis diagram shown in FIG. 5.

| State symbol $(a_{k-2}, a_{k-1})$ | state number (i) | input symbol $(a_k)$ | State transition level $b_{i,j}{}^a$ | New state (j) |
|---|---|---|---|---|
| (1,1) | 1 | 1 | 0 | 1 |
| (1,1) | 1 | −1 | 2.2361 | 2 |
| (1,−1) | 2 | 1 | −4.4722 | 3 |
| (1,−1) | 2 | −1 | −2.2361 | 4 |
| (−1,1) | 3 | 1 | 2.2361 | 1 |
| (−1,1) | 3 | −1 | 4.4722 | 2 |
| (−1,−1) | 4 | 1 | −2.2361 | 3 |
| (−1,−1) | 4 | −1 | 0 | 4 |

TABLE 2

Full description of the trellis diagram shown in FIG.6

| State symbol $(a_{k-2}, a_{k-1})$ | state number (i) | input symbol $(a_k)$ | state transition level $b_{i,j}^a$ | new state (j) |
|---|---|---|---|---|
| (3,3) | 1 | 3 | 0 | 1 |
| (3,3) | 1 | 1 | 1 | 2 |
| (3,3) | 1 | −1 | 2 | 3 |
| (3,3) | 1 | −3 | 3 | 4 |
| (3,1) | 2 | 3 | −2 | 5 |
| (3,1) | 2 | 1 | −1 | 6 |
| (3,1) | 2 | −1 | 0 | 7 |
| (3,1) | 2 | −3 | 1 | 8 |
| (3,−1) | 3 | 3 | −4 | 9 |
| (3,−1) | 3 | 1 | −3 | 10 |
| (3,−1) | 3 | −1 | −2 | 11 |
| (3,−1) | 3 | −3 | −1 | 12 |
| (3,−3) | 4 | 3 | −6 | 13 |
| (3,−3) | 4 | 1 | −5 | 14 |
| (3,−3) | 4 | −1 | −4 | 15 |
| (3,−3) | 4 | −3 | −3 | 16 |
| (1,3) | 5 | 3 | 1 | 1 |
| (1,3) | 5 | 1 | 2 | 2 |
| (1,3) | 5 | −1 | 3 | 3 |
| (1,3) | 5 | −3 | 4 | 4 |
| (1,1) | 6 | 3 | −1 | 5 |
| (1,1) | 6 | 1 | 0 | 6 |
| (1,1) | 6 | −1 | 1 | 7 |
| (1,1) | 6 | −3 | 2 | 8 |
| (1−1) | 7 | 3 | −3 | 9 |
| (1,−1) | 7 | 1 | −2 | 10 |
| (1,−1) | 7 | −1 | −1 | 11 |
| (1,−1) | 7 | −3 | 0 | 12 |
| (1,−3) | 8 | 3 | −5 | 13 |
| (1,−3) | 8 | 1 | −4 | 14 |
| (1,−3) | 8 | −1 | −3 | 15 |
| (1,−3) | 8 | −3 | −2 | 16 |
| (−1,3) | 9 | 3 | 2 | 1 |
| (−1,3) | 9 | 1 | 3 | 2 |
| (−1,3) | 9 | −1 | 4 | 3 |
| (−1,3) | 9 | −3 | 5 | 4 |
| (−1,1) | 10 | 3 | 0 | 5 |
| (−1,1) | 10 | 1 | 1 | 6 |
| (−1,1) | 10 | −1 | 2 | 7 |
| (−1,1) | 10 | −3 | 3 | 8 |
| (−1,−1) | 11 | 3 | −2 | 9 |
| (−1,−1) | 11 | 1 | −1 | 10 |
| (−1,−1) | 11 | −1 | 0 | 11 |
| (−1,−1) | 11 | −3 | 1 | 12 |
| (−1,−3) | 12 | 3 | −4 | 13 |
| (−1,−3) | 12 | 1 | −3 | 14 |
| (−1,−3) | 12 | −1 | −2 | 15 |
| (−1,−3) | 12 | −3 | −1 | 16 |
| (−3,3) | 13 | 3 | 3 | 1 |
| (−3,3) | 13 | 1 | 4 | 2 |
| (−3,3) | 13 | −1 | 5 | 3 |
| (−3,3) | 13 | −3 | 6 | 4 |
| (−3,1) | 14 | 3 | 1 | 5 |
| (−3,1) | 14 | 1 | 2 | 6 |
| (−3,1) | 14 | −1 | 3 | 7 |
| (−3,1) | 14 | −3 | 4 | 8 |
| (−3,−1) | 15 | 3 | −1 | 9 |
| (−3,−1) | 15 | 1 | 0 | 10 |
| (−3,−1) | 15 | −1 | 1 | 11 |
| (−3,−1) | 15 | −3 | 2 | 12 |
| (−3,−3) | 16 | 3 | −3 | 13 |
| (−3,−3) | 16 | 1 | −2 | 14 |
| (−3,−3) | 16 | −1 | −1 | 15 |
| (−3,−3) | 16 | −3 | 0 | 16 |

In line with the Viterbi decoding procedure [3,5], for each state the path with minimal metric leading to that state (the state survivor path) is stored along with the corresponding transition symbols $b_{i,j}^a$ belonging to the state survivor path's segments. At the k-th instant, i.e., the k-th bin in this disclosure, the path with minimal metric for the j-th state is calculated as the extension from one of several possible previous states $s_i$ (defined by particular trellis), whose minimal metrics $\Gamma_{k-1}^i$, increased by the transition metric (squared difference between actually received windowed symbol $b_k$ and the pertinent state transition symbol $b_{i,j}^a$) is minimal. After certain number of traversed states all the state survivor paths are likely to have a common segment in the past and data symbols are decoded by backward search through the trellis. The number of steps taken in the backward direction through the trellis is the parameter known as decoding depth. Denoting decoding depth as κ, at the (k+κ) instant/bin decision is made upon the k-th bin symbol $â_k$.

One example of MLSE decoding procedure is shown in a trellis segment of FIG. 9. Illustrated is the Viterbi algorithm based decoding of a symbol sent on the k-th bin. Decision takes place at the (k+6)-th bin trellis stage, that is the decoding depth is κ=6. With this decoding depth, decision on the symbol sent on the (k+1)-st bin would take place at the (k+7)-th bin stage, and so on.

Take the assumption that the last two (pilot) symbols sent on (k−1)-st and (k−2)-nd bins are known to be 1 and 1, respectively, and that the sequence of actually transmitted symbols $a_k$ to $a_{k+5}$ was 1, −1, −1, 1, −1, −1, corresponding to the trellis path drawn with a solid bold line. The noisy received windowed sample of the k-th bin is $b_k = \bar{b}_k + \eta_k$. From the state s1 at the k-th instant can emerge only two possible candidate values of windowed sample $\bar{b}_k$, namely $b_{1,1}^1 = 0.0$ and $b_{1,2}^{-1} = -2.361$, leading respectively to states s1 and s2 at the next, (k+1)-st, instant. Therefore, if the decision as to which symbol $a_k$ was sent should be made at this stage, then as the value of $â_k$ would be taken the value of the exponent of that one of the two possible transition levels $b_{1,1}^1 = 00$ and $b_{1,2}^{-1} = -2.361$, which is closer to the received sample $b_k$. Since the received sample $b_k$ contains noise part $\eta_k$, the chance exists that its value is sufficiently high and of such polarity to cause the wrong decision. This decision process is equivalent to the DFE decoding process.

In order to reduce the chance for a wrong decision on a particular bin symbol, in this case the symbol $a_k$, in MLSE decoding with the Viterbi algorithm the decision making is postponed to some later stage in the following way. The values $(b_k - b_{1,1}^1)^2$ and $(b_k - b_{1,2}^{-1})^2$ are calculated as state metrics $\Gamma_{k+1}^1$ and $\Gamma_{k+1}^2$, for the (k+1)-st instant states s1 and s2, respectively, since the metric of state s1 at k-th instant is assumed to be preset to zero. For the (k+2)-nd bin states s1 and s2 the state metrics are calculated as $\Gamma_{k+2}^1 = \Gamma_{k+1}^1 + (b_{k+1} - b_{1,1}^1)^2$ and $\Gamma_{k+2}^2 = \Gamma_{k+1}^1 + (b_{k+1} - b_{1,2}^{-1})^2$, respectively. Similarly, for the (k+2)-nd bin states s3 and s4, the state metrics are calculated as extensions of previous state s2 metrics updated by corresponding transition metrics to get $\Gamma_{k+2}^3 = \Gamma_{k+1}^2 + (b_{k+1} - b_{2,3}^1)^2$ and $\Gamma_{k+2}^4 = \Gamma_{k+1}^2 + (b_{k+1} - b_{2,4}^{-1})^2$, respectively. Since there was only one possible path leading to each of four states at (k+2)-nd stage in the trellis, these metrics are retained as minimal metric for respective states. If decision on the $â_k$ value were to be made at this instant, it would be assigned the value of transition symbol from state k to state k+1 belonging to the first segment of the path which led to that one of four states at instant k+2 having minimal metric among the four metrics calculated above. In this particular example, the decision would be correct if the minimal metric would be either $\Gamma_{k+2}^1$ or $\Gamma_{k+2}^2$, and it would be wrong if the minimal of the four metrics would be either $\Gamma_{k+2}^3$ or $\Gamma_{k+2}^4$. Although the chance for a correct decision is made slightly higher, the maximally reliable decision requires much larger postponement (κ=6 in this example).

Since there are generally two possible previous instant states from which transitions lead to each of k+3 instant states, when proceeding with metric calculations for the four states at the instant k+3, only the lower valued metric is retained and the corresponding path is selected as the state survivor path. If the values of two candidate metrics are identical, then either one is chosen. For the state s1, for example, there are two candidate paths: the one is the extended path of state s1 of previous instant k+2 having metric $\Gamma_{k+3}^1 = \Gamma_{k+2}^1 + (b_{k+2} - b_{1,1}^1)^2$, and the other is the extended path from the previous instant state s3 having metric $\Gamma_{k+3}^1 = \Gamma_{k+2}^3 + (b_{k+2} - b_{1,1}^1)^2$. Presuming that the previous sum is lower, the survivor path for state s1 at instant k+3 is denoted by the bold dash-dotted line in FIG. 9. The procedure is repeated for the other three states, with the particular respective survivor paths selections (as an example) represented by the following bold lines: dashed for state s2, dotted for state s3 and full line for state s4. If decision on the $\hat{a}_k$ value were to be made at this instant, then the decision would be correct if the minimal metric is either one of $\Gamma_{k+3}^1$, $\Gamma_{k+3}^3$ or $\Gamma_{k+3}^4$, and the decision would be wrong if the minimal metric at the k+3 instant would be $\Gamma_{k+3}^2$, since the survivor path for s2 state at (k+3)-rd instant has its first segment differing from the correct one.

For the next (k+4)-th stage metrics calculation, the procedure is repeated and again the survivor paths selected. In the present example, the outcome of survivor path selection for state s1 becomes irrelevant regarding the $\hat{a}_k$ decision made at or after this instant, since both candidate paths have as their first segment the transition from state s1 at k-th instant to state s1 at the (k+1)-st instant. The same applies to state s2 as well. The currently selected survivor path for this state has an impact on deciding the $\hat{a}_{k+3}$ at (k+9)-th instant. When it comes to the selection of $\Gamma_{k+4}^3 = \Gamma_{k+3}^2 + (b_{k+3} - b_{1,1}^1)^2$ and the s3 state survivor path, then, if the outcome is given by the full bold line, the incorrect path denoted by the dotted bold line would be eliminated at this stage, unless it extends to state s4 (plain dashed line) to give lower cumulative state metric than is the metric $\Gamma_{k+4}^4 = \Gamma_{k+3}^4 + (b_{k+3} - b_{4,4}^{-1})^2$ calculated along a possible transition from the previous instant state s4 (plain dotted line). Although quite low, the chance for this to happen still exists, but it will become even less probable that this path extends up to the (k+6)-st stage as survivor paths for states s1 and s2, and if so, than the higher becomes the likelihood that either one of $\Gamma_{k+6}^1$ or $\Gamma_{k+6}^2$ is larger then either one of $\Gamma_{k+6}^3$ or $\Gamma_{k+6}^4$, the latter two cumulative metrics belonging to either correct path (bold line) or the survivor path which contains the correct transition between k-th and (k+1)-st bin states. Furthermore, if the transition from the k+3 instant to the state s4 of the k+4 instant proceeds along plain dotted line to determine the survivor path of state s4 at instant k+4, then it is quite possible that the survivor paths of states s1 and s2 at the (k+6)-th instant are also impacted by this transition, in which case all the survivor paths have in common the correct transition segment interconnecting the states s1 at the k-th and (k+1)-st instants, so that for decoding of $a_k$ it would be irrelevant even which state at the (k+6)-th instant has minimal metric value. The actual procedure assumes selection of minimal value and the backward search along the corresponding survivor path in order to make decision on the symbol sent at the k-th instant, i.e. the k-th bin. By extending the trellis for one stage, decoding of value $\hat{a}_{k+1}$, proceeds in the same way, and so on, until all active bin symbols are decoded. The likelihood of selecting the correct survivor path, or for all the survivor paths at a certain instant k+78 to have a common segment at instant κ, is generally increased by increasing the decoding depth parameter κ.

b. Noise Cancellation

As an important part of the present invention, further performance improvement is achievable by imbedding the noise canceling operation within the trellis searching procedure. Along with the basic minimal state metric computation and the selection of survivor paths described above, for each state $s_j$ at the k-th instant, also stored are the "likely" noise samples, each calculated as the difference between the current signal sample $b_k$ and the state transition level $b_{i,j}^a$ belonging to the most recent state transition segment which belongs to the survivor path of that state. When the state transition metric is calculated at instant k+1, the Λ noise samples belonging to the previous state survivor path segments are used to predict the noise for that particular transition and the transition metric is calculated after subtracting the predicted value $\hat{\eta}_{k+1}^{i,j}$ from the current input sample $b_{k+1}$, prior to each transition metric calculation. The predicted value is superscripted by the pair of previous and current state indexes i and j, respectively, since for different transitions, the noise samples used for prediction are also different, as will be exemplified later on.

Along with the basic decoding arrangements, the MLSE blocks 25 in FIGS. 2 and 3 also include a noise cancellation (NC) function with the role of predicting the next noise sample based on previous noise samples and subtracting it from the signal sample used for the current states metric calculations. The pertinent structure is a noise predicting Finite Impulse Response (FIR) filter with coefficients $p_\lambda$, $\lambda=1,2,\ldots,\Lambda$, produced either adaptively using the LMS criterion and known data symbols sent during the DMT transceiver training, or pre-calculated based on spectral factorization of the w(f) shaped noise power spectral density. The first method lends itself well to the estimation of bin-wise varying predictor coefficients $p_\lambda(k)$.

With reference to FIG. 9a, the predictor coefficients $p_\lambda$ are estimated using LMS criterion so that the new coefficient is calculated as the sum of its previous values increased by the scaled product of the current estimation error $e_k$ and the (generally conjugated, if complex valued) sample $\eta_{k-\lambda}$ appearing at the λ-th tap multiplied by $p_\lambda$ and contributing to the currently calculated error sample: $\mu e_k \eta_{k-\lambda}^*$, where μ is the adaptation step-size. The adaptation is performed during training period when transmitted symbols are known at the receiver side, and the noise samples $\eta_k$ are calculated as the difference of received windowed k-th bin sample $b_k$ and the transition symbol $b_{i,j}^a$ which corresponds to the ideal trellis path segment lying between instances k and k+1, as per the example shown in FIG. 9. To estimate the prediction coefficients separately for different frequency bins, or groups of bins, the groups of coefficients are modified only once per DMT symbol interval, or that many times how many bins are to be covered by the same set of prediction coefficients.

In the case of the Hanning window function, the first three coefficients are generally much larger than the rest of the coefficients and thus are most relevant for the prediction process. The following values were produced by conducting a simulation using ideal decisions (as outlined above) and an 8-tap predictor (to be used on all bins) for the white Gaussian noise case: −0.8637, −0.4725, −0.1681, −0.0135, 0.0327, 0.0310, 0.0167 and 0.0068. Only the first three values are used in all the simulation results shown in FIG. 7.

An embodiment of the noise predictor FIR filter to be used in MLSE trellis embedded noise cancellation is shown in FIG. 4 for general sequence of noise samples. The same structure is used in the noise canceling part of this invention with noise samples marked by appropriate superscripts. The noise sample in k-th instant is estimated for every transition from the previous to the current stage. The noise value $\eta_k^{i,j}$ corresponding to the transition from i-th to j-th state, is estimated based on the previous $\Lambda$ noise samples $\eta_{k-1}^{i,j}$ to $\eta_{k-\lambda}^{i,j}$ stored along the survivor path of previous state $s_i$ used to calculate the $s_j$ state metric at k-th instant, respectively weighted by coefficients $p_1$ to $p_\Lambda$ and subsequently summed up, as indicated in FIG. 4. The estimated noise sample is denoted as $\hat{\eta}_{k-\lambda}^{i,j}$ and it is subtracted from the current symbol $b_k$ prior to transition metric calculation.

With reference to the Viterbi decoding procedure illustrated by FIG. 9 and described earlier, the current noise samples $\eta_k^{i,j}$ are produced as difference between the k-th windowed symbol $b_k$ and the $b_{i,j}^a$ values of corresponding state transition. Stored is that one sample which corresponds to survivor path segment, that is, to the lowest of metrics calculated for that state. For example, with reference to FIG. 9, to predict noise sample $\hat{\eta}_{k+3}^{3,2}$ to be subtracted from the windowed symbol $b_{k+3}$ in calculating the transition metric from state s3 at (k+3)-rd instant to state s2 at (k+4)-th instant, the previous noise samples to be weighted by prediction coefficients $p_1$ to $p_3$ are $\eta_{k+2}^{2,3} = b_{k+2} - b_{2,3}^1$, $\eta_{k+1}^{1,2} = b_{k+1} - b_{1,2}^{-1}$ and $\eta_k^{1,1} = b_k - b_{1,1}^1$, respectively. The survivor path metric for state s2 at instant k+4 now is defined as $\Gamma_{k+4}^2 = \Gamma_{k+3}^3 + (b_{k+3} - \hat{\eta}_{k+3}^{2,3} - b_{3,2}^{-1})^2$. The metric of the other candidate survivor path, which in this example is presumably higher then the previously calculated value, is $\Gamma_{k+3}^1 + (b_{k+3} - \hat{\eta}_{k+3}^{1,2} - b_{3,2}^{-1})^2$. The same procedure is applied to other states' and instants' metric calculations. The subtraction of the predictable noise part described above substantially increases the chance of making correct decisions, as will be seen based on the simulation results of FIG. 7.

The samples, comprising signals plus noise, and the coefficients are generally complex in the case of a system in which TEQ is used, or in which a window shape which produces complex PRS coefficients is used. With the Hanning window the predictor coefficients become purely real and the same set of coefficients is used for separate decoding of in-phase and quadrature components.

Simulation was done with 200 active subchannels and N=512. The rest of the subcarriers were loaded with dummy symbols, for the first two of them (closest to lowest frequency bin) to serve as reference for decoding. For the PRS system with L coefficients, L−1 referent symbols are needed in principle, but the L−1 zero-valued symbols for non-used bins at the edges of transmission bandwidth can be used as well in place of referent symbols.

FIG. 7 shows the error probability plots for 2- and 4-bit symbol constellations in the case of MLSE decoding. As noted previously, these results are related to the case of an ideal transmission channel with AWGN. It can be seen that the SNR degradation (for the targeted error probability of $10^{-7}$), compared to the case with no windowing, is some 3 dB smaller in case of MLSE decoding than in the case of DFE decoding. Up to 0.5 dB degradation is incurred by decreasing the decoding depth to 8.

The error probability curves for trellis imbedded noise cancellation bring the SNR degradation down to only about 1 dB as compared to the non-windowed case, that is another 3 to 4 dB of performance improvement, amounting to one more bit per bin load. The curves shown correspond to the use of only three ($\Lambda$=3) coefficients of the prediction polynomial. With decoding depth of $\kappa$=8 instead of $\kappa$=16 as used here, an additional SNR degradation of up to 1 dB is incurred.

5. PRACTICAL REALIZATION

From the practical point of view, the application of MLSE across DMT frequency bins implies non-standard decoding with a varying number of states as a result of generally different sizes of the sub-channel symbol constellations. The problem of varying sizes of neighboring bin constellations can be solved by the method of collapsing and expanding trellises, as illustrated in FIG. 8, showing the transition from a 16-state to a 4-state trellis to reflect the change at the boundary of two assumed groups of 4-bit and 2-bit constellation bins occurring between the K-th and the (K+1)-st bin.

There is a large variety of possible combinations, but all of them are tractable because of the fact that bin constellations are assigned during reception of a MEDLEY sequence, as defined by DMT ADSL standards. The actual bit loading can be determined for the case without windowing (when TEQ is utilized), taking into account the pertinent SNR degradation for the windowing case and MLSE decoding (up to 2 or 5 dBs for Hanning window, depending on the number of bits and whether the noise cancellation is used or not).

The other possibility, prerequisite for the per-bin equalization case, is to calculate SNR figures with windowing included and using DFE decoding (which is equivalent to the MLSE Viterbi algorithm with $\kappa$=1), and to add the SNR gain of 6 to 3 dB, depending on whether noise cancellation is used or not.

Yet another possibility is to perform noise cancellation in combination with DFE decoding by using known transmitted symbols during transceiver training and to add 3 to 4 dB prior to actual bit-loading, to account for MLSE utilization in actual decoding.

From the example in FIG. 8 it can be seen that two new trellis segments have to be introduced before settling on the four-state trellis corresponding to 2-bit constellations. The related state transition levels for the two intermediate instants (bins) are given in Tables 3 and 4. The actual decoding procedure will take care only of the states at which transition ends, and will assign an arbitrarily high metric to inactive (non-involved) states or just ignore them during the backward trellis search. In a similar way all possible variants can be covered by using the highest constellation trellis as a basis, including the full degeneration of the trellis to just one state at the beginning and end of active subchannel groups, as well as an appropriate coverage of intermediate inactive subchannels.

These simulation results of FIG. 7 have assumed the existence of referent symbols to the left and to the right of the active subchannels. However, by properly degenerating the initial trellis segments to take into account two zero-valued symbols, in this example, as shown in FIG. 10, there will be no need for the use of referent bins. In practical applications on severely impaired telephone loops the higher frequency bins in the downstream direction usually remain unloaded, so that sufficient decoding depth can be accommodated also for the highest-frequency active bins by proceeding with decoding of non-loaded bins as well. Also, decoding from left to right and from right to left (in frequency) can be combined to decode bin symbols in upstream direction where the number of bins is much smaller than in the case of upstream transmission.

TABLE 3

Full description of the trellis diagram
for transition from K-th to (K + 1)-st instant.

| state symbol | state number | input symbol | state transition level | new state |
|---|---|---|---|---|
| (3,3) | 1 | 1 | 0.38195 | 2 |
| (3,3) | 1 | −1 | 2.61805 | 3 |
| (3,1) | 2 | 1 | −1.61805 | 6 |
| (3,1) | 2 | −1 | 0.61805 | 7 |
| (3,−1) | 3 | 1 | −3.61805 | 10 |
| (3,−1) | 3 | −1 | −1.38195 | 11 |
| (3,−3) | 4 | 1 | −5.61805 | 14 |
| (3,−3) | 4 | −1 | −3.38195 | 15 |
| (1,3) | 5 | 1 | 1.38195 | 2 |
| (1,3) | 5 | −1 | 3.61805 | 3 |
| (1,1) | 6 | 1 | −0.61805 | 6 |
| (1,1) | 6 | −1 | 1.61805 | 7 |
| (1,−1) | 7 | 1 | −2.61805 | 10 |
| (1,−1) | 7 | −1 | −0.38195 | 11 |
| (1,−3) | 8 | 1 | 2.38195 | 14 |
| (1,−3) | 8 | −1 | 4.61805 | 15 |
| (−1,3) | 9 | 1 | −4.61805 | 2 |
| (−1,3) | 9 | −1 | −2.38195 | 3 |
| (−1,1) | 10 | 1 | 0.38195 | 6 |
| (−1,1) | 10 | −1 | 2.61805 | 7 |
| (−1,−1) | 11 | 1 | −1.61805 | 10 |
| (−1,−1) | 11 | −1 | 0.61805 | 11 |
| (−1,−3) | 12 | 1 | −3.61805 | 14 |
| (−1,−3) | 12 | −1 | −1.38195 | 15 |
| (−3,3) | 13 | 1 | 3.38195 | 2 |
| (−3,3) | 13 | −1 | 5.61805 | 3 |
| (−3,1) | 14 | 1 | 1.38195 | 6 |
| (−3,1) | 14 | −1 | 3.61805 | 7 |
| (−3,−1) | 15 | 1 | −0.61805 | 10 |
| (−3,−1) | 15 | −1 | 1.61805 | 11 |
| (−3,−3) | 16 | 1 | −2.61805 | 14 |
| (−3,−3) | 16 | −1 | −0.38195 | 15 |

TABLE 4

Full description of the trellis diagram
for transition from (K + 1)-st to (K + 2)-nd instant.

| state symbol | state number | input symbol | state transition level | new state |
|---|---|---|---|---|
| (3,1) | 2 | 1 | −0.38195 | 6(¼) |
| (3,1) | 2 | −1 | 1.85415 | 7(²⁄₄) |
| (3,−1) | 3 | 1 | −4.85415 | 10(¾) |
| (3,−1) | 3 | −1 | −2.61805 | 11(⁴⁄₄) |
| (1,1) | 6 | 1 | 0.61805 | 6(¼) |
| (1,1) | 6 | −1 | 2.85415 | 7(²⁄₄) |
| (1,−1) | 7 | 1 | −3.85415 | 10(¾) |
| (1,−1) | 7 | −1 | −1.61805 | 11(⁴⁄₄) |
| (−1,1) | 10 | 1 | 1.61805 | 6(¼) |
| (−1,1) | 10 | −1 | 3.85415 | 7(²⁄₄) |
| (−1,−1) | 11 | 1 | −2.85415 | 10(¾) |
| (−1,−1) | 11 | −1 | −0.61805 | 11(⁴⁄₄) |
| (−3,1) | 14 | 1 | 2.61805 | 6(¼) |
| (−3,1) | 14 | −1 | 4.85415 | 7(²⁄₄) |
| (−3,−1) | 15 | 1 | −1.85415 | 10(¾) |
| (−3,−1) | 15 | −1 | 0.38195 | 11(⁴⁄₄) |

6. CONCLUSION

The described detection method and related simulation results indicate the applicability of MLSE, preferably in the form of the Viterbi algorithm with imbedded noise-cancellation, to considerably compensate for the inherent degradation in SNR as a result of receiver-end windowing in a DMT system. The potential for substantially whitening the noise by using the trellis-embedded noise prediction and cancellation technique is considerable, to the extent to which the neighboring windowed bins noise samples are going to exert significant correlation in practical applications. This invention also provides that predictor coefficients can be made to vary from bin to bin by a proper adaptation during a training interval, so that the correlation of noise other than that caused solely by the windowing mechanism can be accommodated as well.

The overall complexity of the MLSE Viterbi-type decoding of inter-bin PRS interference with 4-bit bin constellations on the average can be roughly estimated to be somewhere close to the complexity pertinent to 16-state 4-dimensional trellis coding, which is standardized for full rate ADSL applications. The very PRS nature of windowing induced inter-bin interference offers certain possibilities to further simplify the MLSE Viterbi decoding procedure. Since the MLSE procedure is likely to be applied in situations where transmission conditions are very harsh, the typical situation to occur may involve many inter-dispersed zero-energy subchannels and a relatively small number of bits per active bin. Note that singled out subchannels do not require any PRS decoding. Also, some low SNR bins can be intentionally turned off during a bit-loading procedure of a training interval. In such situations, instead of applying the Viterbi algorithm, it may even be more appropriate to do the exhaustive search for all the combinations pertinent to certain sub-sets of subchannels separated from other subchannels by an appropriate number of non-loaded bins (two in the case of the Hanning window).

The conventional brute force MLSE decoding of clustered bins, combined with noise prediction/cancellation procedure (described earlier), also constitutes an aspect of the present invention. With reference to FIG. 11, where one example of a related embodiment is shown, for all the possible paths traversing the trellis diagram from the first auxiliary state $s'_0$ to the last auxiliary state $s''_0$ the path metric is calculated as the sum of transition metrics for their segments, with optional provision of noise canceling, and for transmitted sequence is taken the sequence of transition symbols belonging to that particular path.

Since in wireless COFDM (Coded Orthogonal Frequency Division Multiplex) applications the constellation sizes are relatively small and the AWGN is a prevalent additive disturbance, the MLSE decoding of the Viterbi algorithm type can be advantageously used in combination with receiver-end windowing, rendering the method of data transmission performance improvement compliant with current standards.

The advantage of the MLSE decoding and the trellis search imbedded noise cancellation of the present invention is that no transmitter-side modifications are required, yet the attainable level of performance is close to that achievable in the case when (non-rectangular) windowing is done at the transmitter-side only, or when both transmitter- and receiver-end windowing is performed in combination with mutual staggering of quadrature components, the case where there is no need for PRS decoding and the pertained implementation complexity increases.

Although embodiments of the invention have been described herein, the invention is not limited to those embodiments, but is considered to include all modifications, equivalents, variations and other uses that would occur to one having the ordinary level of skill in the art including, for example, adequately accounting for generally complex transition symbols in the trellis-diagram as a result of using FEQ coefficients or window shapes which give complex coefficients.

What is claimed is:

1. A receiver circuit for providing a decoded output from a received discrete multi-tone modulated input signal, the input signal being received from a communication channel having noise thereon, the input signal comprising digital data, the circuit comprising:
- a first stage having a frequency response for applying a discrete Fourier transform to the input signal; and
- a second stage for receiving an output signal from said first stage and per-bin decoding said signal based on a maximum likelihood sequence estimation (MLSE) algorithm so as to recover said digital data;
- wherein said maximum likelihood sequence estimation (MLSE) algorithm includes a calculation of state metrics and is modified to include subtraction of estimated noise samples using noise prediction coefficients.

2. The circuit of claim 1, wherein said noise prediction coefficients are the same for all bins.

3. The circuit of claim 1, wherein at least two bins or groups of bins have different respective noise prediction coefficients.

4. The circuit of claim 1, wherein said modified MLSE algorithm performs cancellation of noise received with said input signal from said communication channel.

5. The circuit of claim 4, wherein said noise is additive noise, additionally colored by a windowing procedure.

6. The circuit of claim 5, wherein said windowing procedure is time domain windowing.

7. The circuit of claim 5, wherein said windowing procedure is frequency domain windowing.

8. A method in a receiver circuit for providing a decoded output from a received discrete multi-tone modulated input signal, the input signal being received from a communication channel having noise thereon, the input signal comprising digital data, the method comprising the steps of:
- applying a discrete Fourier transform to the input signal; and then
- per-bin decoding said signal based on a maximum likelihood sequence estimation algorithm so as to recover said digital data;
- wherein said maximum likelihood sequence estimation (MLSE) algorithm includes a calculation of state metrics and is modified to include subtraction of estimated noise samples using noise prediction coefficients.

9. The method of claim 8, wherein said noise prediction coefficients are the same for all bins.

10. The method of claim 8, wherein at least two bins or groups of bins have different respective noise prediction coefficients.

11. The method of claim 8, further comprising the step of utilizing said modified MLSE algorithm to perform cancellation of noise received with said input signal from said communication channel.

12. The method of claim 11, wherein said noise is additive noise, additionally colored by a windowing procedure.

13. The method of claim 12, wherein said windowing procedure applies time domain windowing.

14. The method of claim 12, wherein said windowing procedure applies frequency domain windowing.

* * * * *